Oct. 8, 1963   M. FERRAND   3,106,043
CULTIVATION TRAY HAVING MOISTURE CONTROL
Filed July 20, 1961
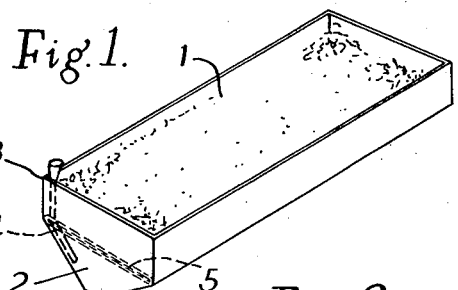
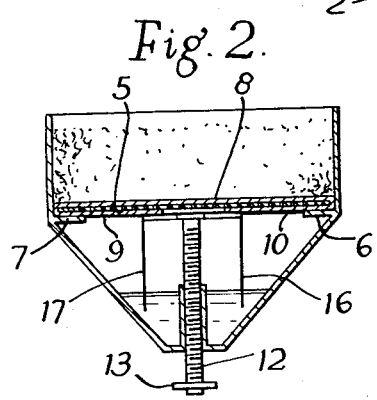
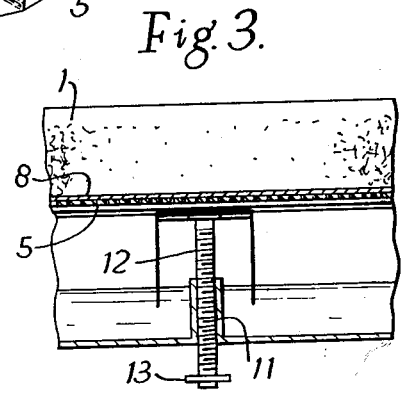
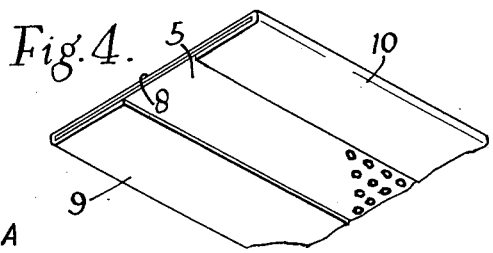
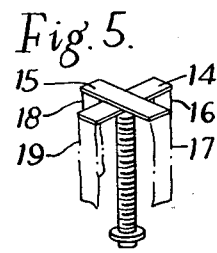
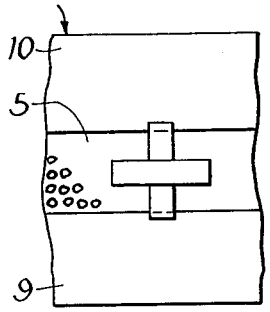
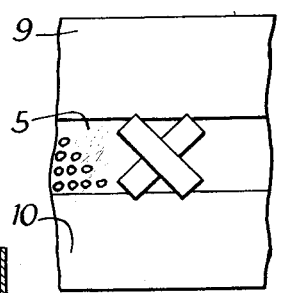
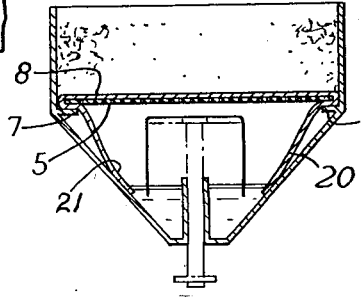
INVENTOR:
MARCEL FERRAND

United States Patent Office 3,106,043
Patented Oct. 8, 1963

3,106,043
CULTIVATION TRAY HAVING MOISTURE CONTROL
Marcel Ferrand, 13 Rue Oswald Larroque, Toulon, France
Filed July 20, 1961, Ser. No. 125,467
Claims priority, application France July 22, 1960
3 Claims. (Cl. 47—38)

This invention relates to cultivation trays for plants.

Use has, of course, been made of porous substances and hanging wicks to convey moisture to plants, but all these distributors of moisture only function when fed from a regular and unvarying source of supply.

There are some cultures or plants, however, which require only a minimum of water, others which require larger quantities, whilst others again require a reduction or increase in moisture as they grow.

The object of the invention is to provide a device for regulating the moistening of soil contained in a tray, permitting heavy or medium moistening which can vary over an entire range from total cessation to maximum impregnation.

Embodiments of cultivation tray in accordance with the invention are hereinafter described with reference to the accompanying drawing, wherein:

FIGURE 1 shows the tray as a whole, in perspective; FIGS. 2 and 3 show the tray in transverse and partial longitudinal section; FIG. 4 shows a unit consisting of a screen and a covering; FIG. 5 is a perspective view of the control means for wicks; FIGS. 6 and 7 show, in diagram form, the variations in the adjustment of the feed; FIG. 8 is a transverse section of a modification.

In FIGURE 1 the tray is formed by a shell made in one piece, the upper portion of which forms a rectagular box to hold the soil and the lower part forms a reservoir 2 of triangular section for storing the liquid. An interior funnel 3 and a pipe 4 serve as means to introduce water into the reservoir.

The upper and lower parts of the tray are separated by a rectangular screen 5, preferably of plastic, which rests on the shoulders 6 and 7. This screen is fitted with a covering 8, also of absorbent plastic cloth but rotproof, which prevents the soil in the upper part 1 from entering the water reservoir either through the holes in the screen or at the edges.

This covering is folded under the lower face of the screen and has portions 9 and 10 extending below the bottom surface of the screen.

The water distributor includes a rod 12 threaded vertically through a sleeve 11 disposed centrally in the reservoir 2, and at the bottom of said rod 12, below the sleeve, is secured an external handle 13, the rotation of said handle rotating said cross shaped member. On the top end of the rod 12 and below the screen is a horizontally disposed cross shaped member, whose horizontal arms 14 and 15 carry the wicks 16, 17, 18, and 19, with their tips hanging into the reservoir. Each wick has a portion that extends above the upper surface of the portion of said cross shaped member at the end of the latter from which it hangs. The rod 12 may be rotated to bring a greater or lesser number, e.g. two or four of said wicks into contact with longitudinal edge portions of said covering below said screen.

In a modification shown in FIGURE 8, the covering 8 may have longitudinal edge portions 20 and 21, laid along the internal walls of the reservoir and dipped into the water to a given distance from the bottom.

The advantages and the working of this device can now be understood.

The soil 1 is separated from the lower reservoir 2 by a perforated screen and a covering which admits air. It is thus in contact with the air, and the funnel 3 provides ventilation which prevents the stagnant water from becoming foul.

Impregnation by evaporation and moistness of the atmosphere is ensured by the permeability of the screens and coverings placed between the soil and the reservoir. Thus there is a slight permanent humidity in the lower portion of the soil which prevents it from drying out completely.

This first stage of natural moistening can be varied to suit the user and can be adapted exactly to the method of cultivation adopted.

By rotation of the cross-pieces 14 and 15, which carry the constant-feed hanging wicks, either none, or two (FIG. 6), or four (FIG. 7) of said wicks are brought into contact with the covering 8.

Impregnation is thus high, moderate, or nil, since the absorbent covering distributes the water by "capillary attraction" to the whole surface of the screen and completely impregnates the soil.

In the modification of FIGURE 8, the trailing edges 20 and 21 of the covering 8 can hang down and be in contact with the water up to a certain level. In this case there will only be two feeds.

This application is a continuation in part of my copending application Serial No. 87,361, filed February 6, 1961.

I claim:

1. In a cultivation tray for plants, said cultivation tray having an upper portion to receive soil and a lower water reservoir,
    (a) a screen supporting soil above said reservoir in said upper portion,
    (b) an absorbent covering over said screen on which soil rests, said covering having portions extending below said screen,
    (c) at least two wicks,
    (d) means supporting said wicks with said wicks hanging into said reservoir, and
    (e) control means moving said means supporting said wicks so that greater and lesser numbers of said wicks contact the portions of said covering extending below said screen.

2. In a cultivation tray for plants, said cultivation tray having a rectangular upper portion to receive soil and a lower V-shaped water reservoir having inlet means to introduce water into said reservoir,
    (a) a rectangular screen supporting soil above said reservoir in said upper portion,
    (b) an absorbent covering extending over said screen on which soil rests, said absorbent covering having two longitudinal edge portions which extend below said screen and extend along the bottom surface of said screen,
    (c) a horizontally disposed cross shaped member disposed below said screen,
    (d) wicks hanging from the ends of said cross-shaped member into said reservoir, each wick having a portion that extends above the upper surface of the portion of said cross shaped member at the end of the latter from which it hangs, and
    (e) control means rotating said cross shaped member so that two and four of said wicks may contact the longitudinal edge portions of said covering which extend below said screen.

3. The combination according to claim 2 wherein said control means comprises
   (a) a sleeve extending upward from the bottom of said V-shaped water reservoir,
   (b) a rod disposed vertically through said sleeve, said cross shaped member being disposed on top of said rod, and
   (c) a handle fixed to the bottom of said rod below said sleeve, the rotation of said handle rotating said cross shaped member.

References Cited in the file of this patent

UNITED STATES PATENTS

| | | |
|---|---|---|
| 1,218,228 | Tillmann | Mar. 6, 1917 |
| 2,249,197 | Brundin | July 15, 1941 |
| 2,804,291 | Segerstad | Aug. 27, 1957 |

FOREIGN PATENTS

| | | |
|---|---|---|
| 823,330 | Great Britain | Nov. 11, 1959 |